May 19, 1936. J. W. POULTER 2,041,266
METHOD AND APPARATUS FOR TREATING SUNKEN COMPOSITE PAVEMENTS
Filed Oct. 2, 1933 4 Sheets-Sheet 1
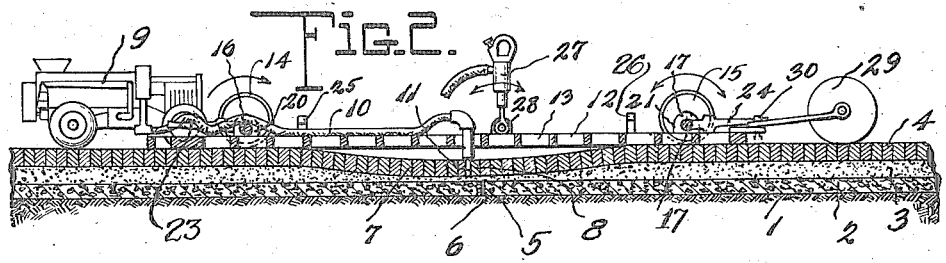
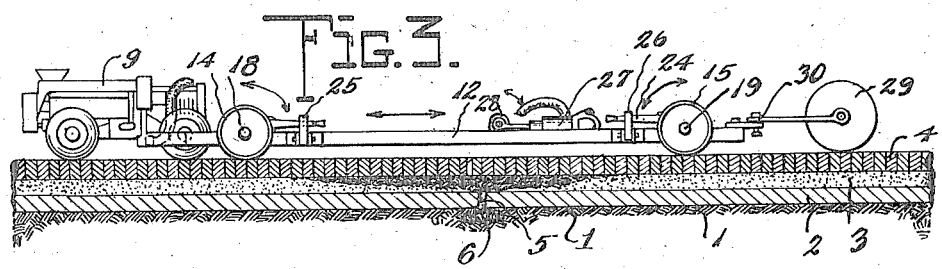
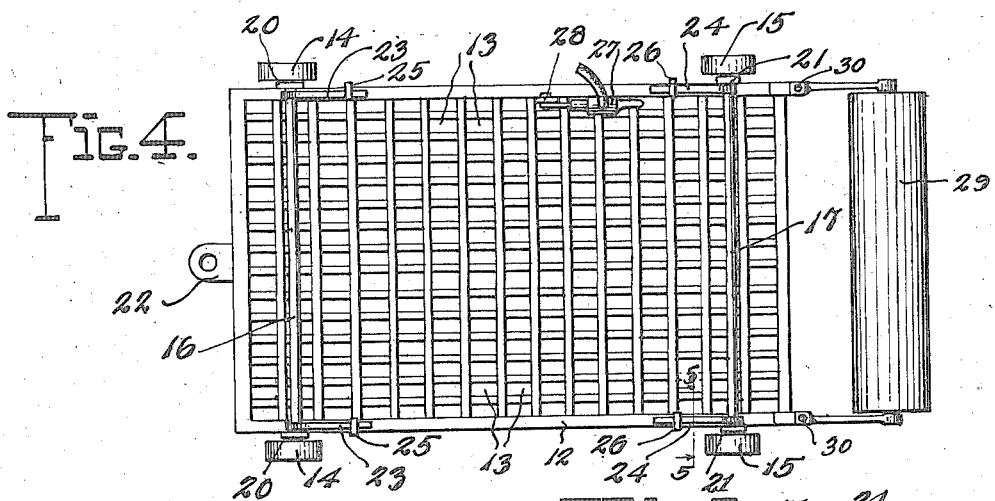
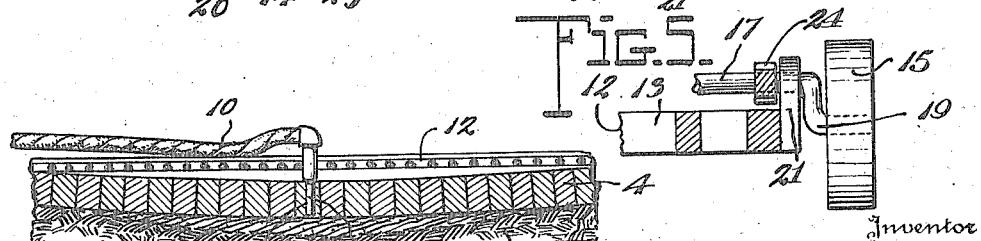
Inventor
JOHN W. POULTER
By Robb & Robb
Attorneys May 19, 1936. J. W. POULTER 2,041,266
METHOD AND APPARATUS FOR TREATING SUNKEN COMPOSITE PAVEMENTS
Filed Oct. 2, 1933 4 Sheets-Sheet 2
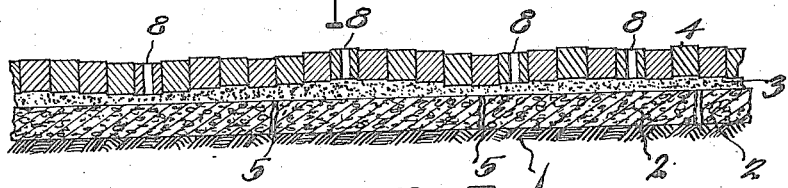
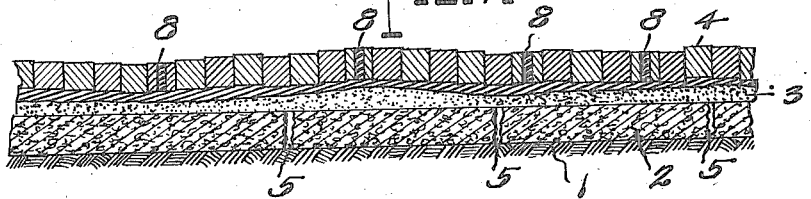
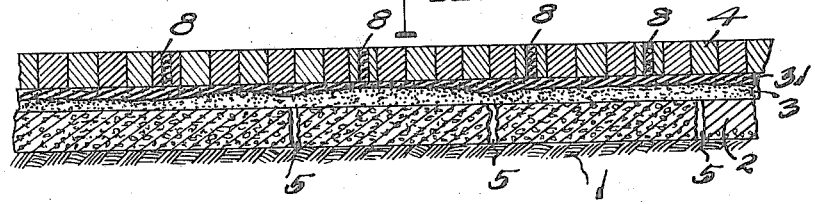
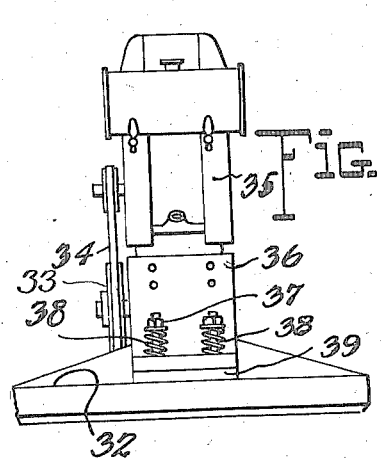
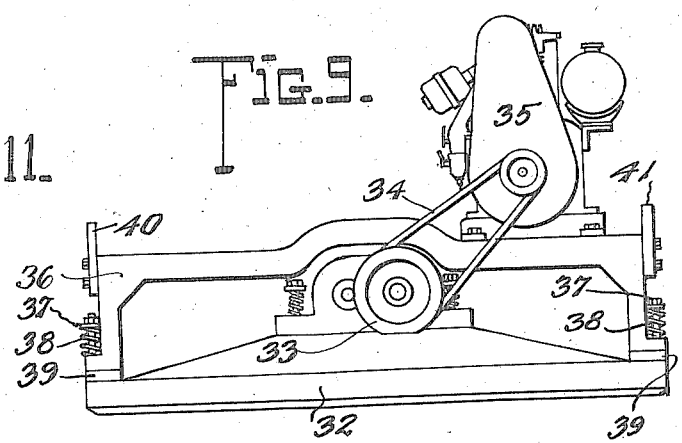
Inventor
John W. Poulter
By Robb & Robb
Attorneys

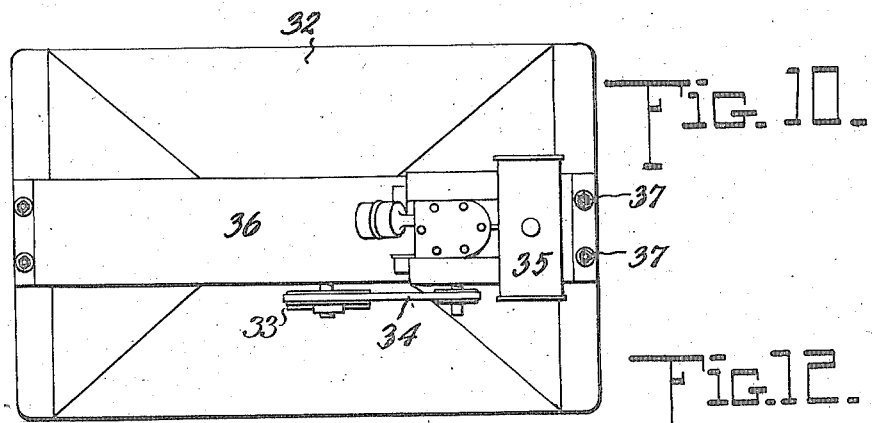
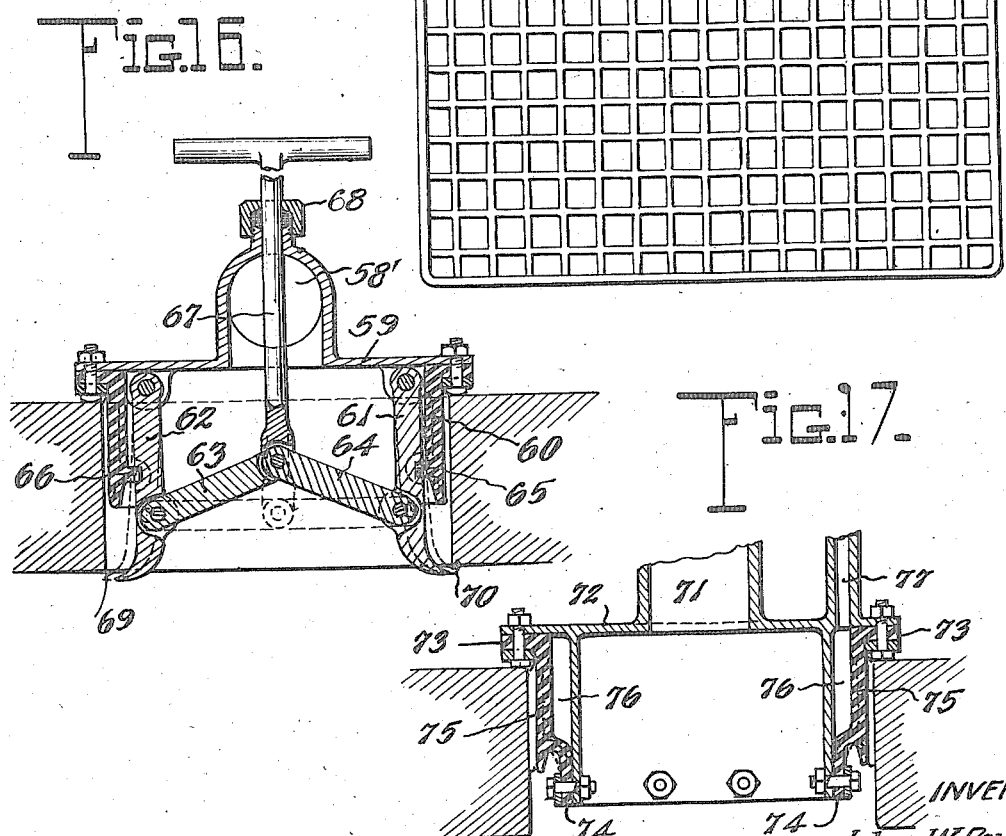

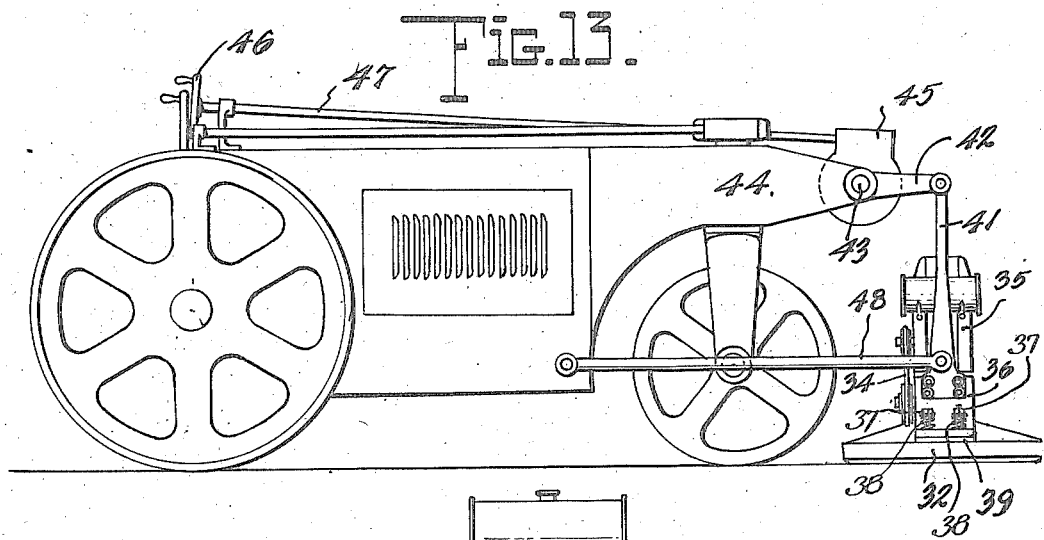
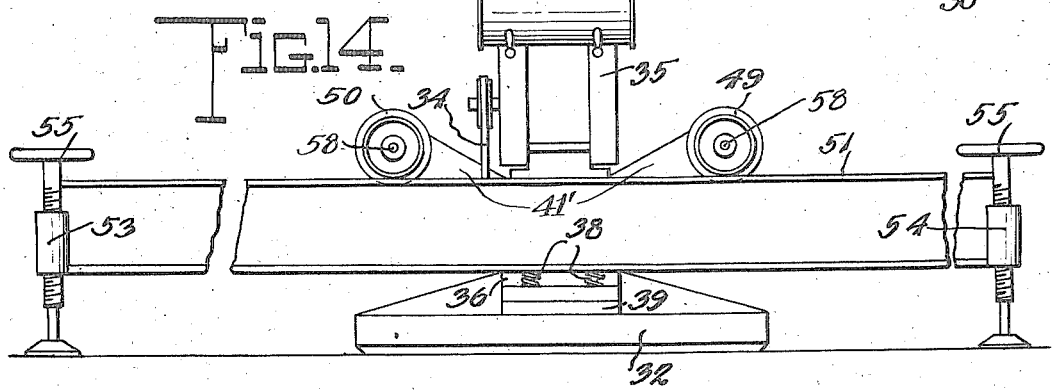
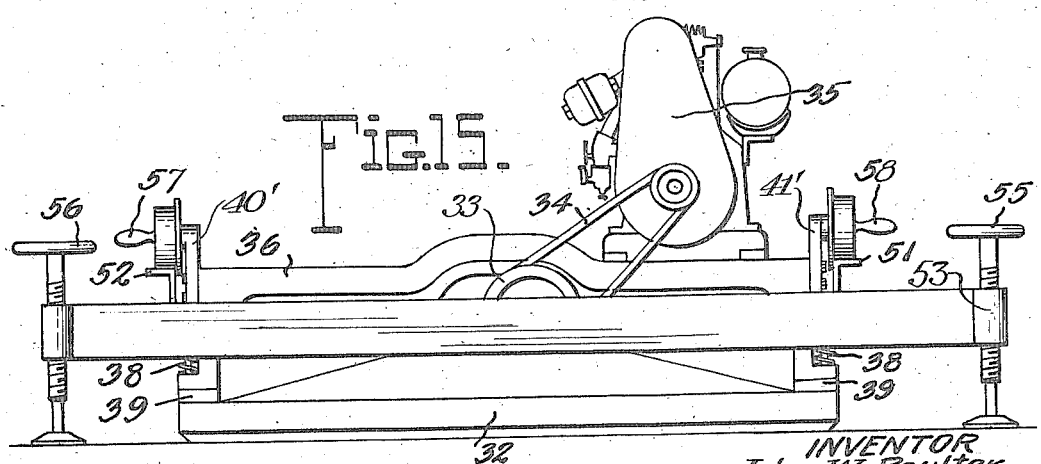

Patented May 19, 1936

2,041,266

UNITED STATES PATENT OFFICE 2,041,266

METHOD AND APPARATUS FOR TREATING SUNKEN COMPOSITE PAVEMENTS

John W. Poulter, Mount Pleasant, Iowa, assignor to National Equipment Corporation, Milwaukee, Wis., a corporation Application October 2, 1933, Serial No. 691,881

23 Claims. (Cl. 94—39)

The present invention appertains to a method and apparatus primarily adapted for use in the maintenance of composite wear surfaces such as brick, block, stone, or tile roads, floors, or other surfacing constructions embodying individual surfacing elements contiguously arranged to provide a continuous wear resisting surface. As will be hereinafter apparent, the invention is also applicable to monolithic surfaces such as are found in the majority of pavement constructions in present day use, where the original monolithic surface has developed unevennesses due to cracking of the pavement and settlement thereof. In the case of these monolithic surfaces, the apparatus forming a part of this invention may be used to the best advantage where the cracks and settlements occur at frequent intervals relatively close together. For the purpose of describing and illustrating the invention, reference will be made to brick pavement constructions from which the adaptation of the invention to the various modifications of pavement constructions will readily be apparent.

In its broad aspect, the invention has to do with the back-filling and raising of sunken pavement constructions, roads and the like, as disclosed and broadly covered in Letters Patent No. 1,915,032, granted to me June 20, 1933, this application being a continuation in part of my co-pending case, Serial No. 542,154, filed June 4, 1931, now issued as Patent No. 1,929,215, granted October 3, 1933, and including divisional subject matter deleted therefrom.

Composite pavements such as brick roadways are generally constructed by providing a concrete base on the road subgrade, on top of which base is spread a cushion of sand or equivalent comminuted cushioning material about an inch or more deep, the bricks being then laid on the sand cushion. It frequently happens that a crack will form in the concrete base due to settlement of the subgrade, or for other reasons, allowing the sand to leak through and causing the brick surface to sink or settle. In many cases the brick surface becomes so rough and uneven that it is necessary to either remove the bricks and put in a new sand cushion, in which event a large part of the old material will be rendered unfit for further use and new material will be required, or the rough and uneven brick surface may be covered over with a "black top." If a thin layer of black top is placed over the choppy or uneven surface, it will be of uneven thickness, and will not properly resist the wear of traffic, becoming pitted out by traffic in a short time and presenting no better riding surface than the uneven brick surface before the black top was added. Either of the foregoing usual methods of correction and repair is expensive.

According to my invention, if a small hole is made through the brick surface as at the corner of one or more bricks, or one or more bricks are removed in a settled or sunken portion of the brick pavement and suitable connection made, hot asphalt or any other suitable sealing material, preferably capable of solidifying, may be forced in any desired manner through the holes or connection to seal off the cracks in the concrete base, thereby stopping further leakage of the sand or cushion material. If sufficient asphalt or other filling material is forced in, the settled bricks may be elevated by the pressure thereof to the original or desired level. When the asphalt cools or the filling material solidifies, it acts as a permanent support for the brick surface. In some instances it may be desirable to roll a roller over the bricks before the asphalt or other sealing medium has set, and thus an even surface will be ensured.

The evenness of the final elevated or restored brick surface may be also attained by limiting the upward movement of the individual bricks during the introduction of the asphalt or other pressure medium beneath the brick layer. To this end a heavy weight member of suitable size and shape, preferably in the form of an openwork iron grating, may be placed upon the brick surface so as to span the sunken or depressed portion of the pavement. Then as the asphalt or other filling material is forced beneath the bricks, if certain bricks raise more quickly than others, their further movement beyond the desired elevation will be restrained or prevented when they are lifted up against the lower surface of the grating. When all of the bricks come up to the grating, the original smooth surface will be ensured. A grating rather than a solid plate is preferred for this purpose since the openings in the grating permit the progress of the elevation of the bricks to be conveniently observed.

Under some conditions it may be desirable to impart a vibration to the bricks during the elevating operations to facilitate their elevation, and for this purpose, one or more air hammers or pavement breakers, or other source of vibratory motion such as a vibralithic motor may be connected to, mounted upon, or otherwise brought into contact with the grating to create a vibration thereof which will be transmitted to the bricks. If desired, the rolling operation above described may be employed as an operation supplementary to the use of the grating, or in some instances, one or the other operation will be sufficient to give the desired evenness to the restored surface.

In cases where the settlement has been uneven and there is considerable difference in elevation in adjoining bricks or the surface has become pitted or choppy, it may be desirable to pump in a layer of filling material between the brick surface and the concrete base, raising the entire surface a small amount, this uneven surface then to be smoothed out before the filler has set up, either by rolling or by using a tamper or vibrator of sufficient size to cover considerable area, or by a combination of both. The weight of the roller passing over the higher bricks will be imparted to the filling material which will in turn cause the lower brick to rise. The pressure exerted on the higher brick by the tamper or vibrator will also tend to raise the lower ones the same as the roller. This tendency to come to the same level will be increased by the inertia of the lower brick as the higher ones are struck by the tamper or vibrator.

The grating and roller may be combined in a unitary machine capable of being used for simultaneous or independent operation of the roller and grating.

It will be apparent that the invention provides a practical and relatively inexpensive solution for the elevation of sunken composite pavement constructions or badly broken monolithic pavement constructions, together with the complete restoration of the original smooth surface.

In the drawings:

Fig. 1 is a somewhat diagrammatic fragmentary sectional view of one form of apparatus capable of carrying out my method of handling sunken brick pavements;

Fig. 2 illustrates a more complete view of suitable apparatus, parts of which are shown in section and parts in elevation, as applied to a sunken section of brick pavement prior to restoration, the dimensions of the various elements being somewhat exaggerated for the sake of clarity;

Fig. 3 is a view generally similar to Fig. 2, showing the brick pavement after restoration;

Fig. 4 is a plan view of a unitary machine forming a part of the apparatus shown in Figs. 2 and 3, for carrying out my process of restoration of the original smoothness of the brick surface;

Fig. 5 is a fragmentary sectional detail view, taken approximately on the line 5—5 of Fig. 4;

Fig. 6 shows a view in vertical section of an uneven or choppy brick surfaced pavement;

Fig. 7 shows an uneven or choppy brick surface as in Fig. 6 under which a somewhat uniform layer of filling material has been forced, raising it to a desired average level;

Fig. 8 shows the brick surface of Fig. 7 restored to original smoothness by a roller or tamping or vibrating grating or a combination of both before the filling material has set up or solidified;

Fig. 9 is a side view of a modified form of tamping or vibrating grating unit;

Fig. 10 is a top view of the tamping or vibrating grating unit of Fig. 9, attachments 40 and 41 of Fig. 9 being omitted;

Fig. 11 is an end view of the tamping or vibrating grating unit of Fig. 9;

Fig. 12 is a bottom view of the tamping or vibrating grating unit of Fig. 9;

Fig. 13 is a side elevation of a modified combination of roller and tamping or vibrating grating;

Fig. 14 is a view in side elevation of a frame spanning the surface to be treated and constituting a modified form of support for a tamping or vibrating grating unit;

Fig. 15 is an end view of the frame of Fig. 14 which spans the surface to be treated and supports the tamping or vibrating grating unit;

Fig. 16 is a sectional view of a mechanical expanding fitting for making connection with a brick surface pavement where a whole brick has been removed; and Fig. 17 is a sectional view of a pneumatic expanding fitting for making connection with a brick surface pavement where a whole brick has been removed.

Like reference characters designate corresponding parts in the several figures of the drawings, wherein 1 denotes the subgrade upon which the pavement is laid. As hereinbefore mentioned, the pavement includes a concrete base 2 upon which is spread a layer of sand 3 or other cushioning material about one inch or a little more in depth, the bricks 4 being laid on the sand cushion in the usual manner. The reference character 5 designates a crack which may occur in the concrete base 2 due to settlement of the subgrade, the crack permitting the sand cushion to leak or flow through the crack beneath the base as at 6, resulting in a depressed or sunken condition of the brick surface as at 7. These sunken or depressed areas may occur at frequent intervals, depending upon the formation of cracks or settlements of the base and/or subgrade.

Now instead of tearing up the pavement and re-laying the same, or applying a surface layer of black top over the bricks to fill in the depressions, I propose to form one or more holes through the brick layer or surface, as at 8, for the purpose of permitting the introduction of a filling material beneath the brick surface to seal off the crack 5 and prevent further leakage of sand therethrough. This material may be hot asphalt which may be pumped under pressure through the holes 8 by any suitable pump or injector. By forcing sufficient asphalt beneath the brick surface, the bricks will be elevated by the hydrostatic pressure exerted thereon, and when the desired level has been restored, the asphalt will solidify and form a permanent support for the restored brick surface.

A thin paste made of Portland cement and water or any other suitable filling material may be used. Other suitable filling materials may be used for the purposes herein, it being merely essential that this material can be mixed into a thin paste which has an even flow and be capable of quickly drying out or solidifying to leave a substantial filling beneath the pavement being treated. As another example of this material; a mixture of soil, a binder, and water, may be used in the following proportions (by volume): soil—25; binder—1; water—12 (100 gallons per cubic yard of soil). The binder may be ordinary cement, lime, or the equivalent thereof, the function of the binder being primarily to hasten the setting of the mix and prevent any material shrinkage thereof during the setting. The water content should be such that the mixture will have a consistency between that of thick cream and mortar. It is to be understood that these proportions are not definitely fixed since it may be desirable to vary the same to accommodate different pavement conditions as well as different soil characteristics.

The type of soil which should be selected is one which will not permit the water to filter out of the mix when the mix is forced beneath the pavement under pressure. Pure sand with water will not produce the results, since the water will flow away from the sand and leave the sand behind to pile up around the holes in the pavement through which it is being forced.

Soils commonly classified as clays are of a very fine grain size and therefore require considerably more water to mix into a thin mud and the addition of a small amount of cement does not materially reduce the shrinkage. These soils are also hard to mix and for these reasons are not good material to be used. It has been found that the best type of soil is a loam such as "White Oak", top soil or of the nature technically classified as Clinton silt loam. Other loose soils which will hold water and be easily mixed into a thin mud may be used. The presence of some sand or clay in the soil will not produce any harmful result, unless their sand content runs appreciably high.

There is shown at 9, a suitable pumping and mixing instrumentality, from which extends the conduit 10 for directing the mix beneath the brick surface through a nozzle 11, which may be inserted into the holes 8. The details of this apparatus will not be specifically referred to herein, and reference may be had to my copending application Serial No. 542,153, filed June 4, 1931, for a more complete discussion of the machine and its operation. It is to be understood that there is no intention of limiting myself to the use of such a machine for forcing the mix beneath the pavement since the mix can be made up in any suitable manner and injected beneath the pavement by any means capable of handling the same for this purpose.

Similarly, I do not wish to be limited to the introduction of the sealing or pressure material through the pavement, since under some conditions it may be desirable to introduce the material beneath the pavement at the edge thereof.

To insure the restoration of a smooth surface, I provide a large heavy iron grating 12 which is positioned to rest on the pavement over the depressed portions, the lower side of the grating defining the grade to which the depressed portion is to be elevated. The openings 13 in the grating permit the progress of the elevation of the pavement to be conveniently observed.

The grating is preferably arranged for convenient transportation as by providing wheels 14 and 15 which are preferably arranged to enable the grating to be lowered onto the pavement to rest thereupon, or elevate the same above the pavement and condition the grating for transportation about and along the pavement. To this end, axles 16 and 17 are respectively provided with offset spindles 18 and 19 on which the wheels 14 and 15 are respectively mounted, the axles being suitably journalled in bearing brackets 20 and 21 secured to the grating. A truck or other draft means may be connected to the grating by the draft hitch 22 for movement of the grating from place to place.

To lower the grating onto the pavement or elevate the same above the pavement for transportation, there are provided suitable levers 23 and 24 fixed to the respective axles 16 and 17, through which the axles may be rotated to dispose the offset spindles in such position as to elevate or lower the wheels 14 and 15 relatively to the grating, as will be clear from the drawings. Latches 25 and 26 hingedly connected to the grating may be provided to lock the levers in position to dispose the wheels in engagement with the ground when the grating is elevated above the pavement for transportation. Obviously, any other suitable mechanism may be employed for these purposes.

As hereinbefore mentioned, it may be desirable to impart a vibration to the pavement during the elevation of the same to the original level, and to this end I have shown by way of example, an air hammer or pavement breaker 27 mounted on the grating. If necessary, more than one such hammer may be employed, and the same may form a permanent part of the apparatus, or an attachment, as desired. As shown, the hammer is mounted on a bracket 28 and is capable of being adjusted in an upright position when in use to vibrate the grating, or folded downwardly to lie upon the grating when not in use or during transportation of the machine. The mounting of the hammer may be at the side of the grating or in any other desired position conveniently accessible to the operator of the machine. It is also to be understood that I do not wish to be limited to the use of an air hammer.

I have also shown a roller 29 connected to the grating at 30 and forming a part of or an auxiliary attachment for the machine, the roller being used to give to the pavement a final smoothing operation after the pavement has been elevated to the level of the grade as limited by the grating, or to be used separately when the pavement has been elevated without using the grating to limit the upward movement of the bricks as hereinbefore described.

Under some conditions, as where the composite pavement, which is essentially of laminated construction, has become depressed or sunken to a material or unusual extent, it may be desirable to preliminarily introduce or force a filling material clear through and underneath the entire paving structure, that is, between the base and the subgrade, according to the method of my Patent No. 1,915,032 to bring the structure to a desired preliminary level. Thereupon, a supplemental elevation of the brick or composite layer may be attained according to the method herein described. If necessary, one or more rows of bricks may be removed for the purpose of permitting the cutting of a stress relief slot in the base to facilitate the preliminary elevation of the entire structure.

To smooth a very uneven or choppy brick surface 4 as shown in Fig. 6, which has been caused by the sand cushion 3 leaking through cracks 5 or shifting under traffic, I also propose to form holes, as at 8, for the purpose of introducing a somewhat uniform layer of filling material 31 (Fig. 7), beneath the brick surface, raising it to a desired average elevation, and later and before the filling material has set up or solidified, smooth the brick surface as shown in Fig. 8 by using a tamper or vibrating grating or roller, or a combination of both.

As a modification of the grating construction of Figs. 2 to 5, I provide a tamper or vibrating unit as shown in Figs. 9, 10, 11 and 12 in which 32 is a tamper or grating surface on which is mounted a suitably vibrating unit 33, driven through a belt 34 by a gasoline motor 35 mounted on a supporting frame 36, which frame is loosely attached to the tamper or grating surface 32 by bolts 37, springs 38 and rubber cushion 39. This tamping or vibrating grating unit is supported over the work by attachments 40 and 41 which may be modified to suit different types of supporting and moving mechanism.

Figure 13 shows a tamping or vibrating grating unit as in Figs. 9 to 12, in combination with a roller to be used as has been hereinbefore mentioned to restore the original smooth surface to an uneven or choppy brick surface or other pavement construction particularly applicable for use after it has been raised to a desired average level by forcing beneath it a somewhat uniform layer of filling material. It is also to be understood that the grating or tamper may be employed during the introduction of the filling material.

This tamping or grating unit is adjustably supported at the desired level with respect to the surface being treated or the roller by extending attachments 40 and 41 of Fig. 9, upwardly for attachment to arm 42 mounted on shaft 43, which is supported by extension of roller frame 44 and on which is mounted a worm gear and worm 45, which is operated by hand wheel 46 through shaft 47. The tamper or vibrating grating unit is supported laterally by brace rods 48 having one end attached to the lower end of 41 and the other to the roller frame 44.

With this combination the surface can be treated with the grating and the roller or the grating can be raised clear of the surface and only the roller used.

As it may be necessary to support the tamping or vibrating unit on a frame or track spanning the surface to be treated, the supports 40 and 41 may be modified as 40' and 41' to carry two rollers each as 49 and 50, (see Figs. 14 and 15) which will roll along the frame side members or channels 51 and 52, which are supported at their ends by cross members 53 and 54 which are in turn supported at their ends as by supporting screws 55 and 56. In operation the screws supporting the frame are adjusted so that the frame which is spanning the surface to be treated and which has been raised to the desired average elevation is a uniform distance above the desired level and also high enough so only the higher points are acted upon by the grating as it is rolled along the track or channels 51 and 52 by handles 57 and 58. As the higher points are smoothed off the frame is gradually lowered and the tamping or vibrating grating unit is rolled back and forth until the original smooth surface is restored.

The terms "tamping" and "vibrating" as used herein may or may not be considered synonymous according to the rapidity of impact and the direction of the forces created. In other words, it is also within the spirit of the invention to employ a hand operated tamper or ram to impart impacts to the bricks during or after introduction of the filling material. A relatively slow succession of impacts such as may be produced by hand operation, as with a ram, might be considered "tamping", whereas a rapid succession of impacts such as may be produced by a motor or mechanical power may be considered as a "vibration". To all intents and purposes they are the same when the direction of the forces is vertically or substantially vertically downward on the pavement. If the direction of the forces is lateral rather than vertical, the motion is more accurately described as a "vibration" rather than a "tamping". Obviously, lateral motion would also be effective for the purposes herein although probably in a lesser degree than a vertical or substantially vertical tamping or vibrating motion.

As has been previously mentioned it may be desirable to make connection with the uneven brick surface by removing a whole brick. Two types of fitting suitable for this purpose are shown in Figs. 16 and 17.

In Fig. 16 is shown a mechanical expanding fitting which connects to hose 10 at 58'. Attached to frame or top part 59 is a rubber sealing member 60 which fits along the four sides of the opening made by removing a brick. Two arms 61 and 62 are also attached to 59, in such a way that when acted on by the toggle members 63 and 64 they will make contact with 69 at 65 and 66, forcing it out against the brick at each end. The toggle members 63 and 64 are actuated by a suitable connection 67 passing through 59 at a stuffing box 68. The lower ends of 61 and 62 are formed in such a way that they will extend under the brick at 69 and 70 holding the fitting in place when pressure of the filling material is applied. The sides of the rubber sealing member are additionally forced against the brick by the pressure of the filling material, making the seal there and allowing the material to be forced beneath the brick surface.

In Fig. 17 is shown a fitting which is to be connected to hose 10 at 71 and having a rigid body 72, which is somewhat smaller than the opening into which the fitting is to be placed. Attached to this body at 73 and 74 is a rubber sealing member 75. The expansion and contraction of this rubber sealing member is effected by admitting or exhausting compressed air to compartment 76, through connection 77.

In operating the fitting is placed in the opening made by removing a brick and expanded by admitting compressed air to compartment 76. After sufficient filling material has been forced in, the flow is stopped and the air exhausted from compartment 76, which allows the rubber sealing member to contract and the fitting to be moved to the next opening, where the same operation is repeated.

The practice of the method of my invention and the use and operation of the apparatus should be clear from the foregoing description.

While the specific details of construction have been herein shown and described, the invention is not confined thereto as changes and alterations may be made without departing from the spirit thereof as defined by the appended claims.

Having thus described my invention, what I claim as new and desire to secure by Letters Patent is:

1. The method of treating paving constructions, which includes the step of forcing under the pavement a filling material in fluid form while vibrating the pavement until the construction is elevated to the desired level.

2. The method of treating paving constructions, which includes the steps of forcing under the pavement a filling material in fluid form while vibrating the pavement until the construction is elevated to the desired level, and subsequently rolling said pavement.

3. The method of treating sunken composite pavement constructions embodying a base on which are disposed contiguously arranged wear resisting elements and an intermediate cushioning material, which comprises sealing said base against leakage of said cushioning material, and forcing under said wear resisting elements a filling material, in fluid form and capable of solidifying, until the wear resisting elements are elevated to the desired level.

4. The method of treating sunken composite pavement constructions embodying a base on which are disposed contiguously arranged wear resisting elements and an intermediate layer of comminuted cushioning material, which comprises sealing said base against leakage of said cushioning material, and forcing under said wear resisting elements while vibrating said elements a filling material, in fluid form and capable of solidifying, until the wear resisting elements are elevated to the desired level.

5. The method of treating composite pavement constructions, which comprises forcing under said pavement a filling material in fluid form to elevate the construction to the desired level, and forcibly limiting the elevating movement of the composite elements as said elements reach said level.

6. In apparatus for elevating sunken composite pavement constructions, the combination, with means for forcing under said pavement a filling material, in fluid form and capable of solidifying, to impart a hydrostatic pressure to said pavement to elevate the same, of means for forcibly limiting the elevation of said pavement.

7. In apparatus for elevating sunken composite pavement constructions, the combination, with means for forcing under said pavement a filling material, in fluid form and capable of solidifying, to impart a hydrostatic pressure to said pavement to elevate the same, of means acting upon said pavement for forcibly limiting the elevation of said pavement.

8. In apparatus for elevating sunken composite pavement constructions, the combination, with means for forcing under said pavement a filling material, in fluid form and capable of solidifying, to impart a hydrostatic pressure to said pavement to elevate the same, of means for limiting the elevation of said pavement, said means comprising a member of substantial weight adapted to rest upon said pavement in spanning relation to said sunken portion and against which the composite elements of the sunken portion are adapted to bear under the elevating action of the filling material aforesaid.

9. In apparatus for elevating sunken composite pavement constructions, the combination, with means for forcing under said pavement a filling material, in fluid form and capable of solidifying, to impart a hydrostatic pressure to said pavement to elevate the same, of means for imparting vibration to said pavement during the elevation of the same by said filling material.

10. In apparatus for elevating sunken composite pavement construction, the combination, with means for forcing under said pavement a filling material, in fluid form and capable of solidifying, to impart a hydrostatic pressure to said pavement to elevate the same, of means for limiting the elevation of said pavement, and means for vibrating said limiting means.

11. In apparatus for elevating sunken composite pavement constructions, the combination, with means for forcing under said pavement a filling material, in fluid form and capable of solidifying, to impart a hydrostatic pressure to said pavement to elevate the same, of means for imparting vibration to said pavement during the elevation of the same by said filling material, and means for applying pressure on said pavement in a direction opposite to the hydrostatic pressure exerted by the filling material, whereby to ensure substantially equal elevation of the composite elements of said pavement.

12. Apparatus for treating sunken composite pavements and the like, comprising means coacting with the pavement, and limiting elevation of the sunken portions thereof, said means including a grating of substantial weight and having portions adapted to rest upon said pavement in spanning relation to the sunken portions thereof and having a grade level defining portion to which the said sunken portions are to be elevated.

13. Apparatus for treating sunken composite pavements and the like, comprising a grating of substantial weight having portions adapted to rest upon said pavement in spanning relation to the sunken portions thereof and having a grade level defining portion to which the said sunken portions are to be elevated, and means on said grating for imparting vibration to the same.

14. Apparatus for treating sunken composite pavements and the like, comprising a grating of substantial weight having portions adapted to rest upon said pavement in spanning relation to the sunken portions thereof and having a grade level defining portion to which the said sunken portions are to be elevated, and supporting means for said grating, said supporting means being shiftable to lower the grating onto the pavement and into a state of rest and further shiftable to elevate the grating for transportation about the pavement.

15. Apparatus for treating sunken composite pavements and the like, comprising a grating of substantial weight adapted to rest upon said pavement in spanning relation to the sunken portions thereof and defining the grade level to which the said sunken portions are to be elevated, and roller means connected to the grating and serving to impart a final levelling to the pavement surface.

16. Apparatus for treating sunken composite pavements and the like, comprising a grating of substantial weight adapted to rest upon said pavement in spanning relation to the sunken portions thereof and defining the grade level to which the said sunken portions are to be elevated, roller means connected to the grating and serving to impart a final levelling to the pavement surface, and means for selectively rendering the grating operative and inoperative relatively to the roller means.

17. The method of treating laminated paving constructions, which comprises forcing a filling material in fluid form beneath the entire pavement structure to give to the pavement structure a preliminary elevation, and subsequently forcing a filling material intermediate the laminations of the pavement structure to complete the elevation of the pavement to the desired level.

18. The method of treating uneven sunken composite pavement construction embodying a base on which are deposited contiguously arranged wear resisting elements and an intermediate layer of comminuted cushioning material, which comprises forcing under said wear resisting elements a filling material, in fluid form capable of solidifying, until said wear resisting elements are elevated to the desired average level and then vibrating said wear resisting surface to secure the desired uniform level before the filling material has solidified.

19. The method of treating uneven sunken composite pavement construction embodying a base on which are deposited contiguously arranged wear resisting elements and an intermediate layer of comminuted cushioning material, which comprises forcing under said wear resisting elements a filling material, in fluid form capable of solidifying, until said wear resisting elements are elevated to the desired average level and then rolling and vibrating said wear resisting surface to secure the desired uniform level before the filling material has solidified.

20. The method of treating uneven sunken pavement construction which includes the steps of forcing under the pavement a filling material, in fluid form capable of solidifying, until the construction is elevated to the desired average level, and vibrating said construction to secure the desired uniform level before the filling material has solidified.

21. The method of treating uneven sunken pavement construction which includes the steps of forcing under the pavement a filling material, in fluid form capable of solidifying, until the construction is elevated to the desired average level, and then rolling and vibrating said construction to secure the desired uniform level before the filling material has solidified.

22. The method of treating paving constructions, which comprises the steps of forcing under the pavement a filling material in fluid form and tamping the pavement until the construction is elevated to the desired level.

23. In apparatus for emplacing fluid materials beneath a pavement surface or the like, said materials being adapted to be passed through an opening in the pavement, means for directing and conveying said materials through said opening including a connector member insertable within the opening, and means for expanding said connector into sealing engagement with the opening, the action of said last named means being separate and distinct from any expansion derived from the passage of the fluid materials through the connector.

JOHN W. POULTER.